United States Patent
Hayashi et al.

(10) Patent No.: US 6,649,298 B2
(45) Date of Patent: Nov. 18, 2003

(54) ELECTRONIC APPARATUS USING FUEL CELL ASSEMBLY

(75) Inventors: Kyoji Hayashi, Hidaka (JP); Nobutaka Nakamura, Hidaka (JP); Naoki Fujiwara, Akiruno (JP); Fumitaka Sato, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 163 days.

(21) Appl. No.: 09/917,688

(22) Filed: Jul. 31, 2001

(65) Prior Publication Data

US 2002/0055029 A1 May 9, 2002

(30) Foreign Application Priority Data

Aug. 1, 2000 (JP) ......................................... 2000-233136

(51) Int. Cl.[7] .......................... H01M 2/00; H01M 2/02; H01M 2/08
(52) U.S. Cl. ............................... 429/34; 429/35; 429/36
(58) Field of Search ............................. 429/13, 34, 35, 429/36, 37, 38, 39

(56) References Cited

U.S. PATENT DOCUMENTS

| | | | | |
|---|---|---|---|---|
| 5,789,093 A | * | 8/1998 | Malhi | 429/34 |
| 5,880,677 A | * | 3/1999 | Lestician | 340/3.1 |
| 5,976,725 A | * | 11/1999 | Gamo et al. | 429/25 |
| 6,057,051 A | | 5/2000 | Uchida et al. | |
| 6,082,122 A | * | 7/2000 | Madenokouji et al. | 62/77 |
| 6,326,097 B1 | * | 12/2001 | Hockaday | 429/34 |
| 6,358,651 B1 | * | 3/2002 | Chen et al. | 429/303 |
| 6,359,777 B1 | * | 3/2002 | Newman et al. | 361/683 |
| 6,447,945 B1 | * | 9/2002 | Streckert et al. | 429/34 |
| 6,459,242 B1 | * | 10/2002 | Bures et al. | 320/132 |
| 6,469,449 B1 | * | 10/2002 | Leung et al. | 315/169.3 |
| 6,522,955 B1 | * | 2/2003 | Colborn | 700/286 |

FOREIGN PATENT DOCUMENTS

| | | | |
|---|---|---|---|
| JP | 9-213359 | 8/1997 | |
| JP | 2000-106201 | 4/2000 | |
| WO | WO 01/71465 | * 9/2001 | G06F/1/16 |

OTHER PUBLICATIONS

Tomimatsu, N. et al., "Fuel Cell", U.S. patent application Ser. No.: 09/523,178, filed Mar. 10, 2000.

Maynard, H.L. et al., "Miniaturized Fuel Cell for Portable Power", 2nd Annual Advances in R&D For the Commercialization of Small Fuel Cells and Battery Technologies for Use in Portable Application, Apr. 26–28, 2000.

Hayashi, K. et al., "Computer System", U.S. patent application Ser. No.: Not Yet Assigned, filed Jul. 17, 2001.

* cited by examiner

*Primary Examiner*—Randy Gulakowski
*Assistant Examiner*—Donald V. Scaltrito
(74) *Attorney, Agent, or Firm*—Finnegan, Henderson, Farabow, Garrett & Dunner, L.L.P.

(57) ABSTRACT

In this invention, a fuel cell assembly and an air channel for supplying air to the fuel cell assembly are arranged in a display unit of an electronic apparatus. A drain hole for draining water produced by the fuel cell assembly is formed in a side surface of the display unit. When a drain tool is connected to the drain hole and the electronic apparatus is in the OFF state, the operation mode switches to a fuel cell assembly mode for using the fuel cell assembly.

27 Claims, 4 Drawing Sheets

ELECTRONIC APPARATUS USING FUEL CELL ASSEMBLY

CROSS-REFERENCE TO RELATED APPLICATIONS

This application is based upon and claims the benefit of priority from the prior Japanese Patent Application No. 2000-233136, filed Aug. 1, 2000, the entire contents of which are incorporated herein by reference.

BACKGROUND OF THE INVENTION

1. Field of the Invention

The present invention relates to an electronic apparatus using a fuel cell assembly as a power supply and, more particularly, to a personal computer using a fuel cell assembly of a type that directly oxidizes methanol.

2. Description of the Related Art

Various types of personal computers using fuel cell assembly have been proposed. In a personal computer using a conventional fuel cell assembly, the fuel cell assembly is mounted in the personal computer body.

Such a personal computer is disclosed in, for example, Jpn. Pat. Appln. KOKAI Publication No. 9-213359. The fuel cell assembly disclosed in Jpn. Pat. Appln. KOKAI Publication No. 9-213359 uses a hydrogen-absorbing metal.

In addition to a fuel cell assembly using a hydrogen-absorbing alloy, a DMFC (a fuel cell assembly designed to directly oxidize methanol) has been devised. Such a DMFC is disclosed in, for example, Japanese Patent Application No. 10-278759 filed by the present applicant. A DMFC does not require so-called auxiliary equipment for a fuel system, and hence has no movable mechanical portion. For this reason, the DMFC is readily made compact and lightweight and can be optimally used as a power supply for a notebook personal computer (to be referred to as a notebook PC hereinafter)

If, however, a DMFC is designed not to have a stacked cell structure so as to manufacture the cell at a low cost, air supplied to the cell relies on diffusion and convection. As a consequence, to supply power required for a current notebook PC, the DMFC has an excessively large area. Even if the performance of a DMFC improves to, for example, 45 mW/$cm^2$, the cell needs to have an area of 1,000 $cm^2$ to supply 45 W. It is therefore the first challenge to incorporate a fuel cell assembly panel having the largest possible area into a notebook PC having limited outside dimensions and improve ventilation of the fuel cell assembly panel without using any ventilating fan.

The biggest merit in using a fuel cell assembly for a portable apparatus is that the apparatus can be used substantially unlimited while being out as long as a fuel is carried. However, the power that can be extracted from the fuel cell assembly is limited. If a high priority is to be given to the long-term use of a personal computer even at the expense of performance, the personal computer needs to be operated with a great restriction on power consumption. However, present notebook PCs are not designed to operate on the power that can be extracted from a fuel cell assembly. The second challenge is therefore to provide a notebook PC which can be used with a restriction imposed on power consumption without making the user misunderstand.

A fuel cell assembly essentially produces water. In general, this water is evaporated by using heat generated in the computer. It is, however, inevitable that evaporated steam is liquefied in the housing of the personal computer or the like, depending on environmental conditions. Designing a personal computer to prevent this water from entering the computer contradicts the requirements of heat dissipation, ventilation, and the like.

In a conventional personal computer, a fuel cell assembly is placed in the computer, and water produced by the fuel cell assembly enters the computer, resulting in a failure in the computer.

BRIEF SUMMARY OF THE INVENTION

The present invention has been made in consideration of the above situation, and has as its object to provide an electronic apparatus which can incorporate a fuel cell assembly panel having a large area and provide good ventilation for the fuel cell assembly panel.

It is another object of the present invention to provide an electronic apparatus which can normally operate even on low power obtained from a fuel cell assembly.

In general, a notebook PC has a display unit which is rotatably mounted on the main body, and is usually rotated to nearly vertical when used. Since the display unit generally has an area near the upper limit within the notebook PC, it is reasonable that a fuel cell assembly panel requiring a large area is placed on the rear surface of the display unit. Since the display panel is often used at an angle near the right angle, convection effectively provides ventilation. Therefore, by placing the fuel cell assembly panel on the rear surface of the display unit, the first challenge can be achieved. Such an arrangement has already been indicated in H. L. Maynard et al., "Miniaturized Fuel cell assembly for Portable Power", 2nd Annual Advances in R&D for the commercialization of Small Fuel Cells and Battery Technologies for use in Portable Applications (Apr. 26–28, 2000).

The efficiency of a fuel cell assembly is generally high at a high temperature, and the fuel cell assembly generates heat equivalent to output power during operation. On the other hand, an LCD panel widely used for a display unit is susceptible to heat.

Since the cathode side of a fuel cell assembly panel requires oxygen, outside air is supplied thereto. Forming an air channel for supplying outside air on the LCD side will facilitate heat insulation between the fuel cell assembly and the LCD panel. This makes it possible to attain a reduction in cost. This is because, the temperature of the air channel is considerably lower than the temperature of the fuel cell assembly panel itself.

According to the first aspect of the present invention, there is provided an electronic apparatus comprising an electronic apparatus body, and a display unit rotatably mounted on the electronic apparatus body, wherein a fuel cell assembly for supplying power to the electronic apparatus and an air channel for supplying air to the fuel cell assembly are arranged in the display unit.

According to the second aspect of the present invention, there is provided a method of driving an electronic apparatus including an electronic apparatus body, and a display unit rotatably mounted on the electronic apparatus body, the display unit having a fuel cell assembly for supplying power to the electronic apparatus and a drain hole for draining water produced by the fuel cell assembly, comprising the steps of switching to a fuel cell assembly mode for using the fuel cell assembly, when it is detected that a tool for collecting water produced by the fuel cell assembly is connected to the drain hole, and a power supply of the electronic apparatus is in an OFF state, and executing a power supply ON sequence unique to the fuel cell assembly mode when the power supply of the electronic apparatus is turned on, and the output power of the fuel cell assembly reaches a predetermined value.

According to the present invention, the operation mode can be automatically switched to the fuel cell assembly mode only when a tool for collecting water produced by the fuel cell assembly is connected to the drain hole, and the electronic apparatus is in the OFF state. This prevents the user from making erroneous operation mode setting.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

A personal computer according to an embodiment of the present invention will be described below with reference to the views of the accompanying drawing.

Figure 1:
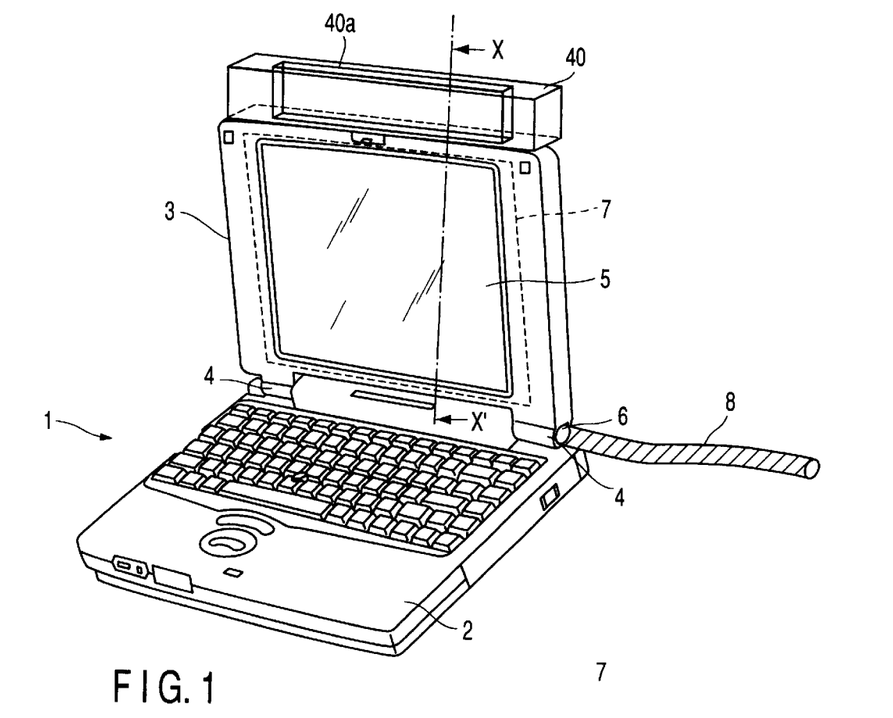
FIG. 1 is a perspective view of a notebook PC according to an embodiment of the present invention.

FIG. 1 is a perspective view of a notebook PC according to an embodiment of the present invention. As shown in FIG. 1, a notebook PC 1 includes a personal computer body 2 and a display unit 3 rotatably mounted on the personal computer body 2 through hinges 4.

The display unit 3 has a display panel 5 and fuel cell assembly panel 7. The fuel cell assembly panel 7 is placed in the housing of the display unit 3, and hence is shown by the dotted lines. By placing the fuel cell assembly panel 7 in the housing of the display unit in this manner, a large area for the fuel cell assembly panel can be ensured.

A drain hole 6 for draining water produced by the fuel cell assembly panel 7 is formed in a side wall of the housing of the display unit 3 at the near end to the personal computer body 2.

During the notebook PC 1 is running, the display unit 3 of the notebook PC 1 is generally kept near vertical. For this reason, a portion of the water produced in the fuel cell assembly panel 7 which has not vaporized and remained in the form of a liquid is gathered to a lower portion by gravity.

This can therefore prevent insufficient ventilation due to the water produced in the fuel cell assembly panel 7. When the user connects a drain hose 8 to the drain hole 6, the water gathered to the lower portion of the display unit 3 is discharged outside so as not to affect the notebook PC 1. A tool other than the drain hose, e.g., a bottle for collecting water, may be connected to the drain hole 6.

Although not shown in FIG. 1, the drain hole 6 has a drainage sensor for detecting that a drain tool, e.g., the above drain hose or drain bottle, is connected to the drain hole 6.

Like conventional notebook PCs, this notebook PC can be powered by a large power supply capacity using a detachable Li battery and receive power through an AC adapter. In this case, as in the prior art, the notebook PC can perform high-speed, high-performance operation using a power of several ten W level. When the fuel cell assembly is to be used, this notebook PC 1 operates in a specialized fuel cell assembly mode in which power consumption remains in a predetermined range by a method to be described later.

A fuel cartridge 40 for supplying a fuel to a fuel cell assembly panel 7 is mounted on the upper surface of the display unit 3. A through hole 40a is formed in this fuel cartridge 40 to prevent interference with the flow of air supplied to the fuel cell assembly panel 7 for supplying air to the fuel cell assembly panel 7 mounted on the display unit 3.

Although not shown in FIG. 1, a mesh-like member for preventing insertion of undesirable object such as a pencil or stick may be mounted in the outlet/inlet of the through hole 40a of the fuel cartridge 40.

Figure 2:
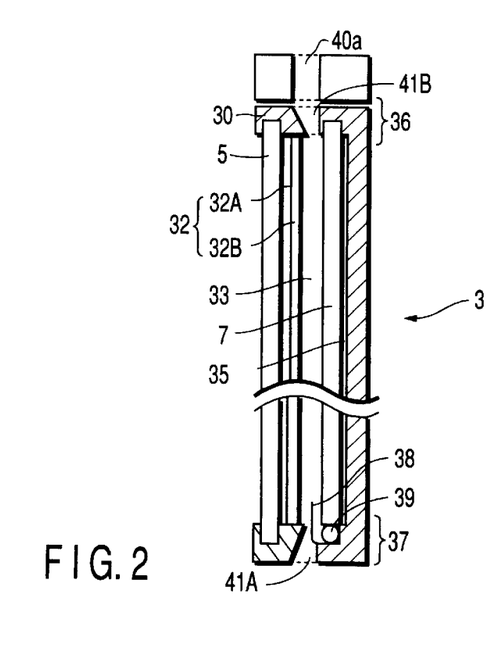
FIG. 2 is a sectional view taken along a line X–X' of the display unit of the notebook PC.

FIG. 2 is a sectional view taken along a line X–X' of the display unit 3 of the notebook PC 1 in FIG. 1. The display unit 3 is rotatably connected to the personal computer body 2 through the hinges 4.

Referring to FIG. 2, reference numeral 30 denotes the housing of the display unit 3. In general, this housing is made of plastic or a magnesium alloy and serves to physically hold constituent elements in the display unit 3 and protect them when, for example, the notebook PC 1 is carried.

This housing 30 has an LCD panel 5. The internal structure of the LCD panel 5 is not shown in FIG. 2. At the level of the conceptual structure described with reference to FIG. 2, the conventional display unit 3 is comprised of the housing 30 and LCD panel 5.

In the notebook PC of this embodiment, the fuel cell assembly panel 7 is mounted in the display unit 3, and a shield 32 is inserted between the LCD panel 5 and the fuel cell assembly panel 7.

The shield 32 is constituted by a metal plate 32A and heat insulating layer 32B. The metal plate 32A may be a metal foil.

The metal plate 32A prevents electromagnetic waves generated from the LCD panel from being radiated outside. In a conventional notebook PC, the magnesium alloy of a housing itself or the plating on the inner surface of a plastic housing prevents unnecessary electromagnetic waves radiated from the LCD panel from being radiated outside.

When the fuel cell assembly panel 7 is placed behind the rear surface of the LCD panel 5, the metal plate 32A is preferably placed immediately behind the LCD panel 5 to block unnecessary electromagnetic waves. This is because, the fuel cell assembly panel 7 requires air, resulting in difficulty in blocking electromagnetic waves. In addition, the shield 32 also serves to insulate the water produced in the fuel cell assembly panel 7 from the LCD panel 5.

The heat insulating layer 32B thermally insulates the LCD panel 5 and fuel cell assembly panel 7. The fuel cell assembly panel 7 is heated to a temperature higher than that in an operation environment for general electronic equipment.

The LCD panel 5, especially an STN LCD, considerably deteriorates in contrast at a high temperature. Therefore, the heat resistance between the LCD panel 5 and the fuel cell assembly panel 7 must be sufficiently high. The heat insulating layer 32B serves as a means for this purpose.

An air supply channel 33 is formed between the shield 32 and the fuel cell assembly panel 7. The air supply channel 33 serves to supply air to the fuel cell assembly panel 7, and is provided between the shield 32 and fuel cell assembly panel 7.

More specifically, the air supply channel 33 is formed into a laminar shape to supply air to the entire area of one surface of the fuel cell assembly panel 7. That is, the space between the shield 32 and fuel cell assembly panel 7 forms the air supply channel 33.

The reason why the air supply channel 33 of the fuel cell assembly panel 7 is formed near the LCD panel 5 is that the average temperature of the air supply channel 33 is generally lower than that of a fuel supply channel 35, and the above heat insulation is facilitated accordingly.

The placement of the metal plate 32A between the heat insulating layer 32B and the LCD panel 5 reduces the temperature nonuniformity of the LCD panel 5, providing a good effect in the use of an STN LCD in particular. Note that the shield 32 may be integrated with the LCD panel 5.

Using the metal plate 32A instead of a metal foil improves safety in some cases. The display unit 3 includes a light source for backlight as a component. In many cases, a relatively high voltage is applied to this light source.

If this light source is integrated with the fuel cell assembly panel 7, an accident may occur when the user carelessly inserts a conductive rod into an air inlet 41A of the fuel cell assembly panel 7.

By separating the fuel cell assembly panel 7 from the LCD panel 5 using the metal plate 32A, the safety in such a case can be improved. Referring to FIG. 2, the LCD panel 5 has a flat shape. In actual design, however, the backlight light source and its power supply, in particular, do not have flat shapes in many cases.

In such a case, the metal plate 32A must be formed into a shape other than a flat shape in accordance with the actual shapes of the above components. Since such design is easy to make, a description thereof will be omitted. That is, this apparatus may be shaped to effectively insulate a portion where a high voltage is applied and a problem may occur in terms of safety from the air inlet 41A for a fuel cell assembly.

For the sake of simplicity, FIG. 2 does not show the internal structure of the fuel cell assembly panel 7. This fuel cell assembly panel is a so-called DMFC designed to generate power by directly oxidizing methyl alcohol.

Typically, therefore, in such a panel, a layer (anode) containing methyl alcohol and water is formed one side of a solid-state polymeric film through which hydrogen ions pass, and a layer (cathode) that receives air and oxidizes hydrogen ions is formed on the other side of the polymeric film.

For the above reason, the gap between the LCD panel 5 and the heat insulating layer 32B located near the LCD panel 5 is used as the air supply channel 33, and the gap between the housing and the fuel cell assembly is used as the fuel supply channel 35.

The fuel cartridge 40 is mounted on the upper portion of the display unit 3. Although not shown in FIG. 1, the fuel cartridge 40 serves to supply methyl alcohol as fuel to the fuel supply channel 35.

An air outlet 41B and the air inlet 41A are formed in an upper edge portion 36 and lower edge portion 37 of the housing 30 of the display unit 3 to supply air to the fuel cell assembly. The area of the opening portion of each of the air inlet 41A and air outlet 41B is set to be larger than the area of the opening portion on the air supply channel 33 side to become almost equal to the cross-sectional area of the air supply channel 33, thereby preventing blockage of an air flow.

Figure 8:
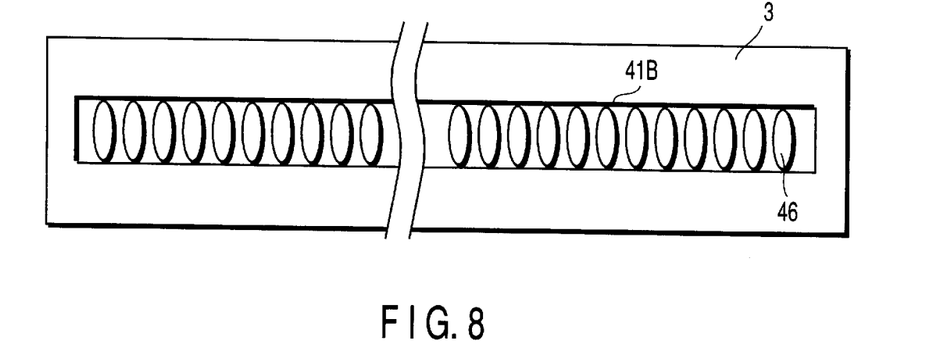
FIG. 8 is a view showing the upper surface of the display unit.

FIG. 8 shows the upper surface portion of the display unit 3 without the fuel cartridge 40. As shown in FIG. 8, a plurality of vents 46 are formed in an opening portion of the air outlet 41B of the display unit 3.

The display unit 3 of the notebook PC is generally kept open at an angle near the right angle during operation. In accordance with this state, the air supply channel 33 of the fuel cell assembly panel 7 draws air through the air inlet 41A at the lower portion 37 of the housing 30 of the display unit 3 by natural convection, supplies oxygen in the air to the fuel cell assembly panel 7, and exhausts air through the air outlet 41B at the upper portion 36 of the housing 30.

During operation, the fuel cell assembly generates considerable heat (if the efficiency is 50%, the same amount of heat as that generated in the notebook PC (the display panel including the backlight and the main body) is generated in the fuel cell assembly panel). The thickness of the air supply channel 33 is minimized by using the chimney effect produced by this heat.

To facilitate the supply of oxygen to the fuel cell assembly panel 7, the fuel panel may be inverted, and a hole may be formed in the housing opposing the panel. In this case, however, the overall thickness of the display unit 3 needs to be greatly increased to assure safety in consideration of, for example, a case where the notebook PC collides against an external projection while the user is carrying the PC.

In this embodiment, the thickness of the display unit 3 of the notebook PC is considerably larger than that of the display unit of a conventional notebook PC. To prevent a further increase in thickness, no air inlet is preferably formed in the surface of the housing that opposes the fuel cell assembly panel 7.

Note that FIG. 2 is a conceptual illustration, and hence does not show the great differences between the heights of the upper and lower portions 36 and 37 of the housing 30 and the thickness of the housing that opposes the fuel cell assembly panel 7. It is widely known that the heights of the upper and lower portions 36 and 37 of the housing 30 of the conventional notebook PC are much larger than the thickness of the housing.

Although ventilation based on a chimney effect can be expected, the air supply channel 33 must be designed to be wider than the fuel supply channel 35. Fuel supply is mainly performed as transportation of a liquid using wettability and capillarity. The fuel supply channel 35 also serves as an exhaust channel for carbon dioxide gas produced by hydrolysis of methyl alcohol.

When, however, the overall thickness of the display unit is to be decreased, the air supply channel 33 may be designed to be wider than the fuel supply channel 35. To prevent evaporation of methyl alcohol, the fuel supply channel 35 is preferably designed as a closed channel having an outlet for carbon dioxide gas.

More specifically, the lower end (corresponding to the portion 37) of the fuel supply channel 35 is normally closed, and an opening that is much smaller than a portion corresponding to the air supply channel 33 is formed in the upper end portion of the fuel supply channel 35 to discharge carbon dioxide (not shown)

As is known well, drying of the fuel cell assembly panel must be prevented while the fuel cell assembly is not used. Doors that are kept closed while the fuel cell assembly is not used are attached to the upper and lower end gates of the air supply channel 33.

In addition, doors are provided for a drain outlet 5 and the carbon oxide outlet to mainly prevent water in the fuel cell assembly from dropping while the notebook PC is carried. These doors are not shown because they should be designed in accordance with individual situations.

A drain member 38 is provided for the lower portion 37 of the housing 30 to receive water produced by the fuel cell assembly panel 7 and guide it to a hole 39 communicating with the drain hole 6 formed in the side surface of the display unit 3. In this case, the shape of the drain member 38 is designed to sufficiently ensure air supplied from the air inlet 41A to the fuel cell assembly panel 7 through the air supply channel 33.

This drain member 38 receives water produced in the fuel cell assembly panel 7 and guides it to the hole 39. As a result, the water is drained through the drain hole 6.

Figure 3:
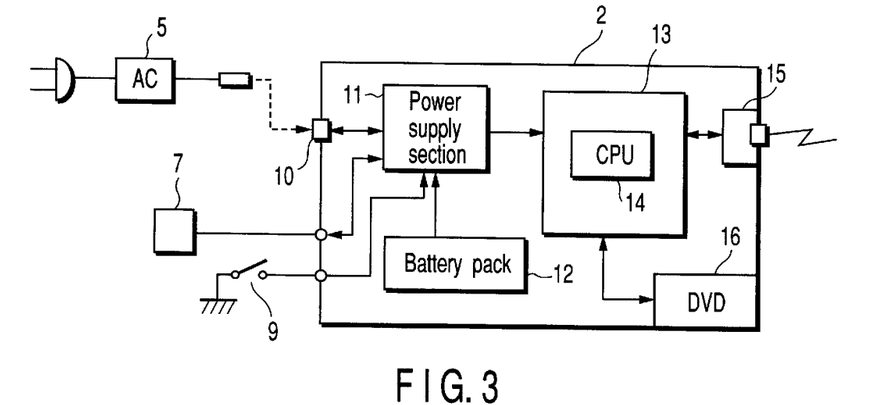
FIG. 3 is a block diagram of the notebook PC according to an embodiment of the present invention.

FIG. 3 is a block diagram of the notebook PC according to this embodiment of the present invention. FIG. 3 shows only the constituent elements required to explain a fuel cell assembly mode to be described later, but does not show all the constituent elements of the notebook PC.

An AC adapter 5 is connected to a power supply input connector 10 of the notebook PC 1. The power input from the display panel 5 is converted into a voltage suitable for each portion in the notebook PC by a power supply portion 11, and applied to each portion.

As in the prior art, the power supply portion 11 is connected to a battery pack 12 so that it can charge the battery pack 12, and can receive power from the battery pack 12 and supply it to each portion in the notebook PC as described above.

One of the portions to which the power supply portion 11 supplies power is a main board 13 of the notebook PC 1. The main board 13 has a CPU 14. FIG. 3 shows a modem 15 and DVD player/recorder 16 as examples of peripheral devices connected to the main board 13.

The power output from the fuel cell assembly panel 7 mounted in the display unit 3 is also input to the power supply portion 11. An output from the sensor 9 described above is also input to the power supply portion 11.

As in the prior art, the power supply portion 11 incorporates a DC/DC converter, power supply microcomputer, cell charge/discharge control IC, and the like. Even while the notebook PC 1 is kept off, the power supply microcomputer operates on low power to monitor events such as pressing of the power switch of the notebook PC and supply of power to the power supply input connector 10 as in the prior art.

One of the characteristic features of the power supply microcomputer according to the present invention is that an operation mode of using the fuel cell assembly is set when it is expected from the operation of the drainage sensor 9 that water is properly drained from the fuel cell assembly panel 7, and the power supply voltage of the fuel cell assembly panel 7 falls within a predetermined voltage range.

Assume that the notebook PC is in the OFF state, and the drainage sensor 9 of the fuel cell assembly panel 7 is operating while the AC adapter 5 is not connected. In this case, when it is determined that fuel is supplied to the fuel cell assembly panel 7, and the fuel cell assembly is set in the ON state, the fuel cell assembly mode is set.

Since an operation mode is automatically set in this manner, no mode setting error due to a user operation error occurs.

The fuel cell assembly mode will be described in detail next.

In the fuel cell assembly mode, the power consumption during the operation of the notebook PC 1 is reduced to allow the notebook PC 1 to operate on the power supplied from the fuel cell assembly.

Although several methods of reducing power consumption are conceivable, typical methods will be described below. Obviously, any method of reducing power consumption, other the following methods, may be used, and some of the methods to be described below may be combined.

Figure 4:
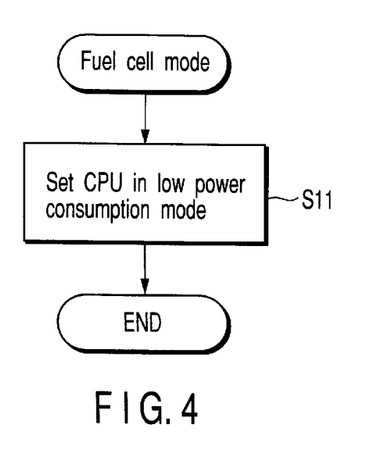
FIG. 4 is a flow chart for explaining the first example of a fuel cell assembly mode.

The first example is a method of setting the CPU in a low power consumption mode (step S11) when the current operation mode is switched to the fuel cell assembly mode. Since the technique of allowing the CPU to operate in the low power consumption mode is a well known technique, a detailed description thereof will be omitted. A recent CPU is designed with the principal emphasis being placed on a reduction in power consumption at a high operation speed. For this reason, in some cases, the power supply voltage applied to the core in the CPU chip is minimized, and leakage currents from the transistors increase. In such a case, in the fuel cell assembly mode of greatly decreasing the clock rate, the power consumption may be reduced by slightly increasing the power supply voltage to the core as compared with the normal mode. As is known, in the normal mode, the power consumption is reduced by decreasing the power supply voltage to the core.

The CPU architecture also preferably has the low power consumption mode. For example, to increase the degree of parallel processing, a recent CPU obtains a result as if a plurality of instructions designated for serial execution on the program were executed in parallel and the results were serially output without any inconsistency. In the fuel cell assembly mode, the power consumption is preferably reduced by a design for simply serially executing commands without supplying the power to a circuit for such parallel processing.

In the second example, applications, which cannot be executed in the fuel cell assembly mode or are inappropriate to execute in the fuel cell assembly mode, are not executed.

Figure 5:
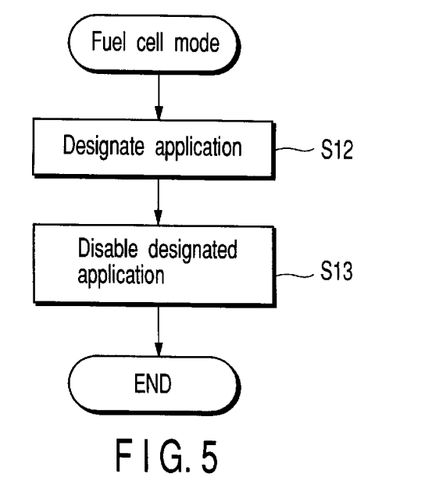
FIG. 5 is a flow chart for explaining the second example of the fuel cell assembly mode.

More specifically, as shown in FIG. 5, the user designates in advance applications which cannot be executed in the fuel cell assembly mode or are inappropriate to execute in the fuel cell assembly mode (S12).

In this case, the user designates the applications in advance. However, the applications may be automatically detected by software or designated in advance at the time of shipment from a factory. The designated applications are disabled to inhibit the start (S13).

In this embodiment, traditional office applications (e.g., WORD) and Internet accesses using the modem 15 can operate (moving image or music application cannot operate, as described above). These applications can be practically executed even by a CPU with considerably low performance and are also determined as applications whose needs for long-time use outdoor are high.

In the third example, some peripheral devices are not activated.

Figure 6:
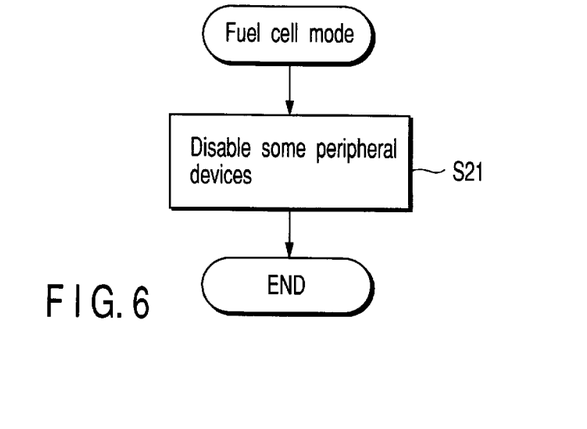
FIG. 6 is a flow chart for explaining the third example of the fuel cell assembly mode.

More specifically, as shown in FIG. 6, some peripheral devices are disabled (S21). In this embodiment, the DVD player/recorder 16 is not activated in the fuel cell assembly mode. This is because the DVD player/recorder 16 itself requires high power consumption, and a moving image as a main application that uses the DVD player/recorder 16 requires full use of CPU performance and therefore real-time processing cannot be executed by the CPU in the low power consumption mode.

In the fuel cell assembly mode, the battery pack 12 is not charged or discharged (is not used as a power supply). This is because, in the fuel cell assembly mode, the operation of the PC cannot relay on the battery pack 12. The user is required to understand this point in using the PC. In addition, this operation is inhibited to avoid the undesired operation of charging the battery with a low voltage from the fuel cell assembly.

Switching between the fuel cell assembly mode and the normal mode is performed only when the notebook PC is in the OFF state. This facilitates switching to the low power consumption mode at the CPU architecture level. This operation is also important from the viewpoint of the prevention of a user operation error.

If fuel is fed into the fuel cell assembly of the notebook PC 1 which is operating in the normal mode, a warning message is displayed on the screen, and the notebook PC 1 keeps operating in the normal mode in this embodiment. This eliminates ambiguity in interpreting the fuel cell assembly mode, and hence prevents a contradiction between user expectations and the operation of the notebook PC 1.

Figure 7:
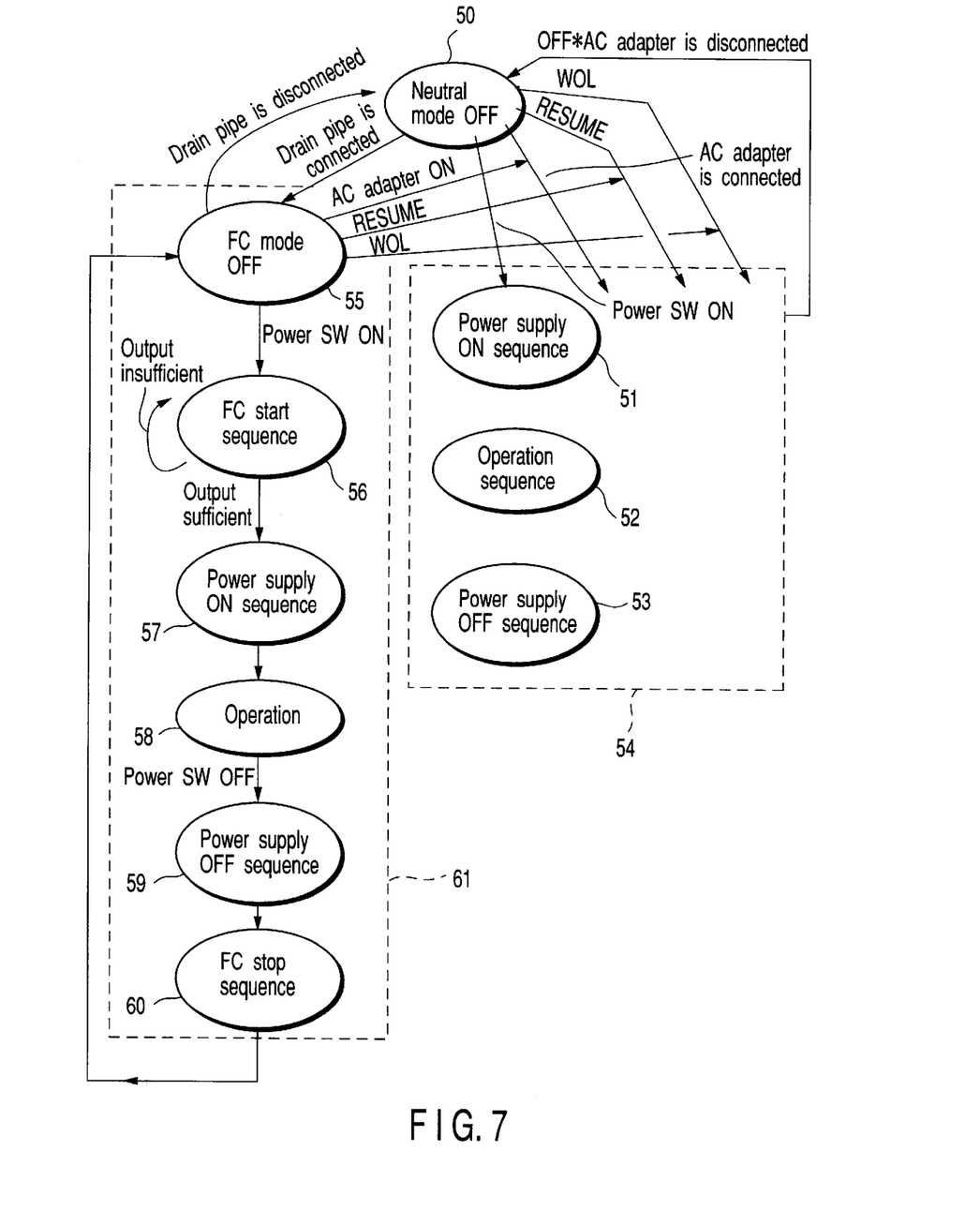
FIG. 7 is a state diagram for explaining mode switching of the notebook PC according to this embodiment.

FIG. 7 is a state transition chart for explaining mode switching operation for the notebook PC according to this embodiment. More specifically, in this embodiment, this operation is implemented as firmware of the power supply control microcomputer.

A state 50 is an initial state. Overall power supply control for the conventional notebook PC is included in a frame 54. This control can be basically used as part of this embodiment of the present invention without any change, and hence a detailed illustration thereof is omitted in FIG. 7.

The state 50 is equivalent to the OFF state in the prior art, in which each processing sequence is started in accordance with an event such as turning on the power SW, meeting a resume condition, or meeting Wake On LAN condition.

A series of operations to be executed when the power switch is turned on are shown as states 51 to 53 altogether. In this case, FIG. 7 shows the power ON sequence 51, operation sequence 52, and power OFF sequence 53.

The state 50 is the only neutral state which allows switching between the fuel cell assembly mode and the normal mode in this embodiment. If a drain pipe or water collecting unit is connected to the drain hole 6 of the fuel cell assembly (FC) in this state, the current mode switches to an OFF state 55 as the fuel cell assembly mode. In this case, the drainage sensor 9 shown in FIG. 3 detects the connection of the drain pipe or water collecting unit to the drain hole 6.

If the power switch is turned on, the notebook PC is started in the fuel cell assembly mode. Unlike the normal mode such as an Li battery driving mode, a sequence 56 of starting the fuel cell assembly is executed before the start of the power supply ON sequence for the notebook PC.

Since the manner of starting the fuel cell assembly greatly varies depending on the design of a fuel cell assembly unit, a detailed description of this sequence will be omitted. In general, in this step, the temperature of the fuel cell assembly is raised, and the fuel cell assembly is connected to a built-in dummy load to increase the output of the fuel cell assembly to a predetermined value.

This operation is performed because the load response speed of the fuel cell assembly is generally very low. When a large load variation occurs, it may take a time of about 1 sec before the stabilization of a current. If, therefore, the notebook PC is directly started by using a fuel cell assembly without no load, sufficient power cannot be supplied.

When the output of the fuel cell assembly becomes sufficiently high, the power supply microcomputer executes a power supply ON sequence 56 for the notebook PC. This sequence is essentially the same as the power supply ON sequence 51 in the prior art, but slightly varies depending on the form of the fuel cell assembly mode. If, for example, a predetermined peripheral device is disabled, the number of components to which power should be supplied decreases. In this sense, this sequence is the power supply ON sequence unique to the fuel cell assembly mode.

Since the subsequent operation in the fuel cell assembly mode is almost the same as that in the normal mode, a description thereof will be omitted. The operation in a frame 61 in FIG. 7 corresponds to a state where the notebook PC is set in the fuel cell assembly mode. In this mode, while the notebook PC is operating, mode switching is inhibited.

Mode switching is allowed only after the notebook PC is turned off, and its state shifts to the state 55. Likewise, while the notebook PC is in the normal mode, i.e., in the state enclosed with the frame 54, switching to the fuel cell assembly mode is inhibited. During the normal mode, power input from the fuel cell assembly is disconnected by a switch in the power supply portion 11.

Even if, therefore, the user feeds fuel into the fuel cell assembly during the operation of the notebook PC on the battery, the fuel cell assembly is substantially kept in the disconnected state at this time. The current mode switches to the fuel cell assembly mode through the neutral mode only after the user turns off the notebook PC.

In the state 55, in which an drain means is connected to the fuel cell assembly, and the notebook PC is in the OFF state, if, for example, a condition for Wake On LAN is satisfied, the notebook PC operates in the same manner as in a case where the condition is satisfied in the neutral mode.

More specifically, the notebook PC is started by using the battery as a power supply, and processing for Wake On LAN is started. In this case, since the normal mode is set, power from the fuel cell assembly is disconnected.

According to the notebook PC of this embodiment, therefore, by mounting a single-panel type fuel cell assembly, which is easier to manufacture, in the display unit of the notebook PC, a fuel cell assembly panel having a size similar to that of the display unit of the notebook PC can be used. As a consequence, high power can be supplied to the notebook PC as compared with the conventional notebook PC.

According to this embodiment, since a drain unit is connected to the drain hole, and the operation mode is automatically switched to the fuel cell assembly mode only when the notebook PC is in the OFF state, no mode setting error based on the misunderstanding of the user occurs.

The implementation of the fuel cell assembly mode can prevent the use of the notebook PC beyond the capacity of the fuel cell assembly.

In addition, in this embodiment, in the fuel cell assembly mode, the built-in secondary battery is not charged/discharged. This reliably makes the user understand that he/she cannot relay on the built-in secondary battery in the fuel cell assembly mode.

As described in detail above, according to the present invention, there is provided an electronic apparatus which can incorporate a fuel cell assembly panel having a large area, and provides good ventilation for the fuel cell assembly panel. In addition, an electronic apparatus which can properly operate even at a low output obtained from a fuel cell assembly can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus, comprising:
   a display unit having a display panel;
   a fuel cell assembly arranged in the display unit, which supplies power to the electronic apparatus;
   an air channel, arranged between the display panel and the fuel cell assembly, which supplies air to the fuel cell assembly;
   a first vent provided to a bottom surface of the display unit; and
   a second vent provided to an upper surface of the display unit.

2. The apparatus according to claim 1, further comprising a shield, located between the fuel cell assembly and the display panel, configured to prevent conduction of heat generated by the fuel cell assembly to the display panel.

3. The apparatus according to claim 1, further comprising a shield, located between the fuel cell assembly and the display panel, configured to prevent a failure caused by electromagnetic waves generated by the display panel.

4. The apparatus according to claim 1, further comprising a shield, located between the fuel cell assembly and the display panel, configured to prevent water produced by the fuel cell assembly from entering the display panel.

5. The apparatus according to claim 2, wherein a drain hole for draining water produced by the fuel cell assembly, which is formed in a side surface of the display unit.

6. The apparatus according to claim 3, wherein a drain hole for draining water produced by the fuel cell assembly, which is formed in a side surface of the display unit.

7. The apparatus according to claim 4, wherein a drain hole for draining water produced by the fuel cell assembly, which is formed in a side surface of the display unit.

8. The apparatus according to claim 5, wherein the apparatus further comprises a sensor for detecting that a drain unit is connected to the drain hole; and
   the fuel cell assembly is used when the sensor detects that the drain unit is connected to the drain hole.

9. The apparatus according to claim 6, wherein the apparatus further comprises a sensor for detecting that a drain unit is connected to the drain hole; and
   the fuel cell assembly is used when the sensor detects that the drain unit is connected to the drain hole.

10. The apparatus according to claim 7, wherein the apparatus further comprises a sensor for detecting that a drain unit is connected to the drain hole; and
    the fuel cell assembly is used when the sensor detects that the drain unit is connected to the drain hole.

11. The apparatus according to claim 1, wherein
    a fuel supply channel for supplying fuel to the fuel cell assembly is formed between the fuel cell assembly and the display unit; and
    a cross-sectional area of the air channel is larger than that of the fuel supply channel.

12. The apparatus according to claim 5, further comprising:
    a detection unit detecting that a tool for collecting water produced by the fuel cell assembly is connected to the drain hole; and
    a unit causing the apparatus to operate in a low power consumption mode when using the fuel cell assembly as a power supply, if the detection unit detects that the tool is connected to the drain hole and a power supply of the electronic apparatus is in an OFF state.

13. The apparatus according to claim 6, further comprising:
    a detection unit detecting that a tool for collecting water produced by the fuel cell assembly is connected to the drain hole; and
    a unit causing the apparatus to operate in a low power consumption mode when using the fuel cell assembly as a power supply, if the detection unit detects that the tool is connected to the drain hole and a power supply of the electronic apparatus is in an OFF state.

14. The apparatus according to claim 7, further comprising:
    a detection unit detecting that a tool for collecting water produced by the fuel cell assembly is connected to the drain hole; and
    a unit causing the apparatus to operate in a low power consumption mode when using the fuel cell assembly as a power supply, if the detection unit detects that the tool is connected to the drain hole and a power supply of the electronic apparatus is in an OFF state.

15. A method of driving an electronic apparatus including an electronic apparatus body, and a display unit rotatably mounted on the electronic apparatus body, the display unit having a fuel cell assembly for supplying power to the electronic apparatus and a drain hole for draining water produced by the fuel cell assembly, comprising:
    detecting that a tool for collecting water produced by the fuel cell assembly is connected to the drain hole and a power supply of the electronic apparatus is in an OFF state;
    switching to a fuel cell assembly mode for using the fuel cell assembly, when it is detected that a tool for collecting water produced by the fuel cell assembly is connected to the drain hole, and a power supply of the electronic apparatus is in an OFF state; and
    executing a power supply ON sequence unique to the fuel cell assembly mode when the power supply of the electronic apparatus is turned on, and a power of the fuel cell assembly reaches a predetermined output value.

16. The method according to claim 15, wherein the apparatus operates in a low power consumption mode in the fuel cell assembly mode.

17. The method according to claim 15, wherein a predetermined application program is executed in the fuel cell assembly mode.

18. An apparatus according to claim 15, wherein a predetermined peripheral device is driven in the fuel cell assembly mode.

19. An electronic apparatus comprising:

a display panel provided in a display unit;

a fuel cell assembly arranged in parallel with the display panel;

an air channel which is arranged between the display panel and fuel cell assembly such that the air channel faces the fuel cell assembly and which has openings at upper and lower end portions of the display unit, respectively; and a shield, arranged between the air channel and display panel, configured to shield the display panel from water generated by the fuel cell assembly.

20. The apparatus according to claim 19, wherein the shield is configured to shield the fuel cell assembly from an electromagnetic wave generated from the display panel.

21. The apparatus according to claim 19, wherein the display unit has a drain hole, which is formed at lower portion of the display unit, configured to drain water produced from said fuel cell assembly.

22. The apparatus according to claim 1, further comprising a fuel cartridge for supplying a fuel to the fuel cell assembly, mounted on the upper surface of the display unit.

23. The apparatus according to claim 19, further comprising a fuel cartridge for supplying a fuel to the fuel cell assembly, mounted on the upper surface of the display unit.

24. The apparatus according to claim 22, wherein the fuel cartridge has a through hole for exhausting air supplied from the air channel.

25. The apparatus according to claim 23, wherein the fuel cartridge has a through hole for exhausting air supplied from the air channel.

26. An electronic apparatus comprising:

a display unit having a display panel;

a fuel cell assembly arranged in the display unit, which supplies power to the electronic apparatus;

a fuel supply channel, provided in the display unit, for supplying fuel to the fuel cell assembly;

an air channel, arranged between the display panel and the fuel cell assembly, which supplies air to the fuel cell assembly;

a first vent provided to a bottom surface of the display unit;

a second vent provided to an upper surface of the display unit; and a fuel cartridge supplying a fuel to the fuel cell assembly, mounted on the upper surface of the display unit.

27. The apparatus according to claim 26, wherein the fuel supply channel is formed between the fuel cell assembly and the display unit.

* * * * *